Aug. 13, 1957  A. GOLDENBERG ET AL  2,802,906
VEHICULAR ELECTROMAGNETIC SOUND RECORDING
AND REPRODUCING SYSTEM
Filed Aug. 14, 1953  3 Sheets-Sheet 1
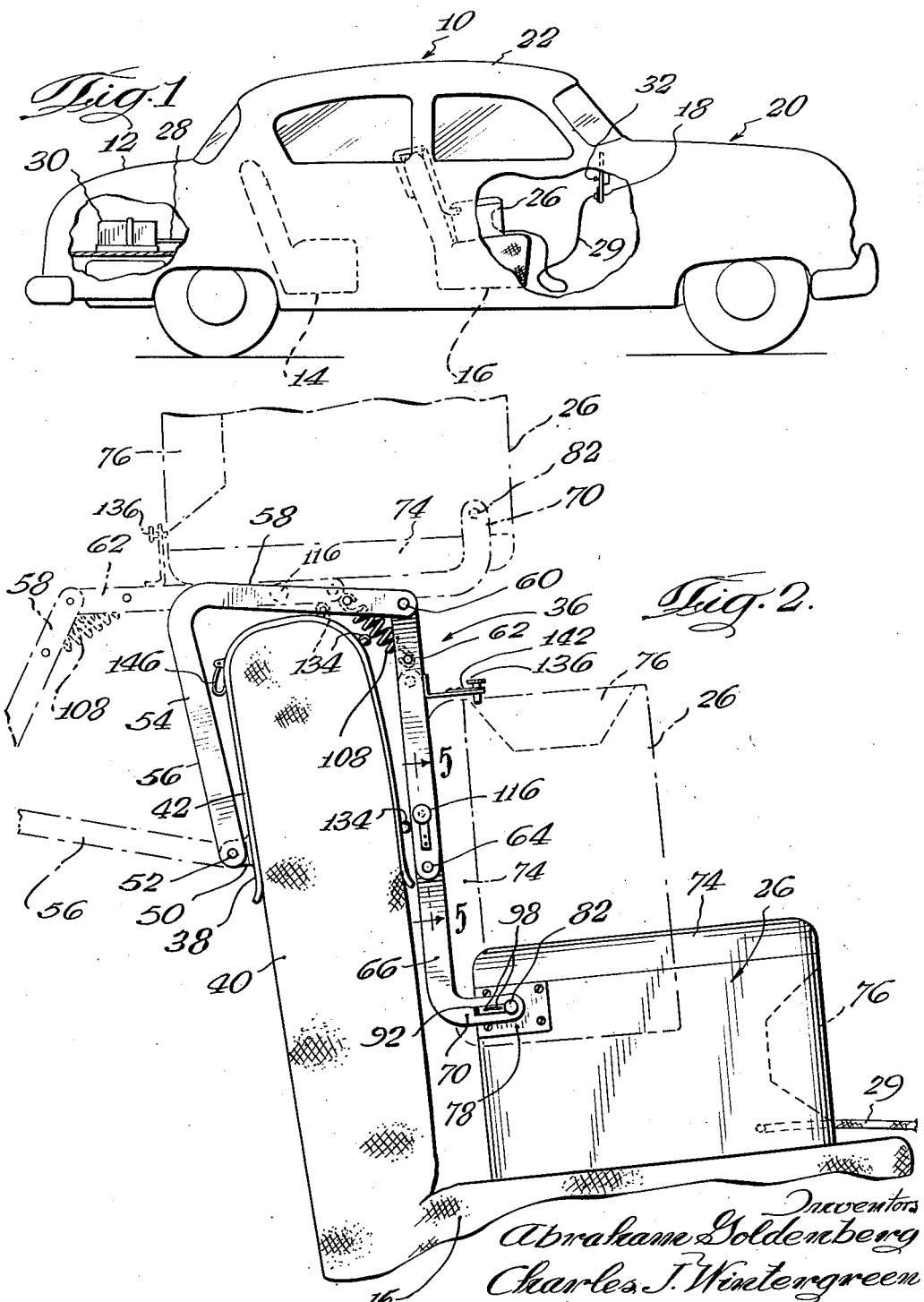
Inventors
Abraham Goldenberg
Charles J. Wintergreen
By Silverman & Mullin
Attorneys

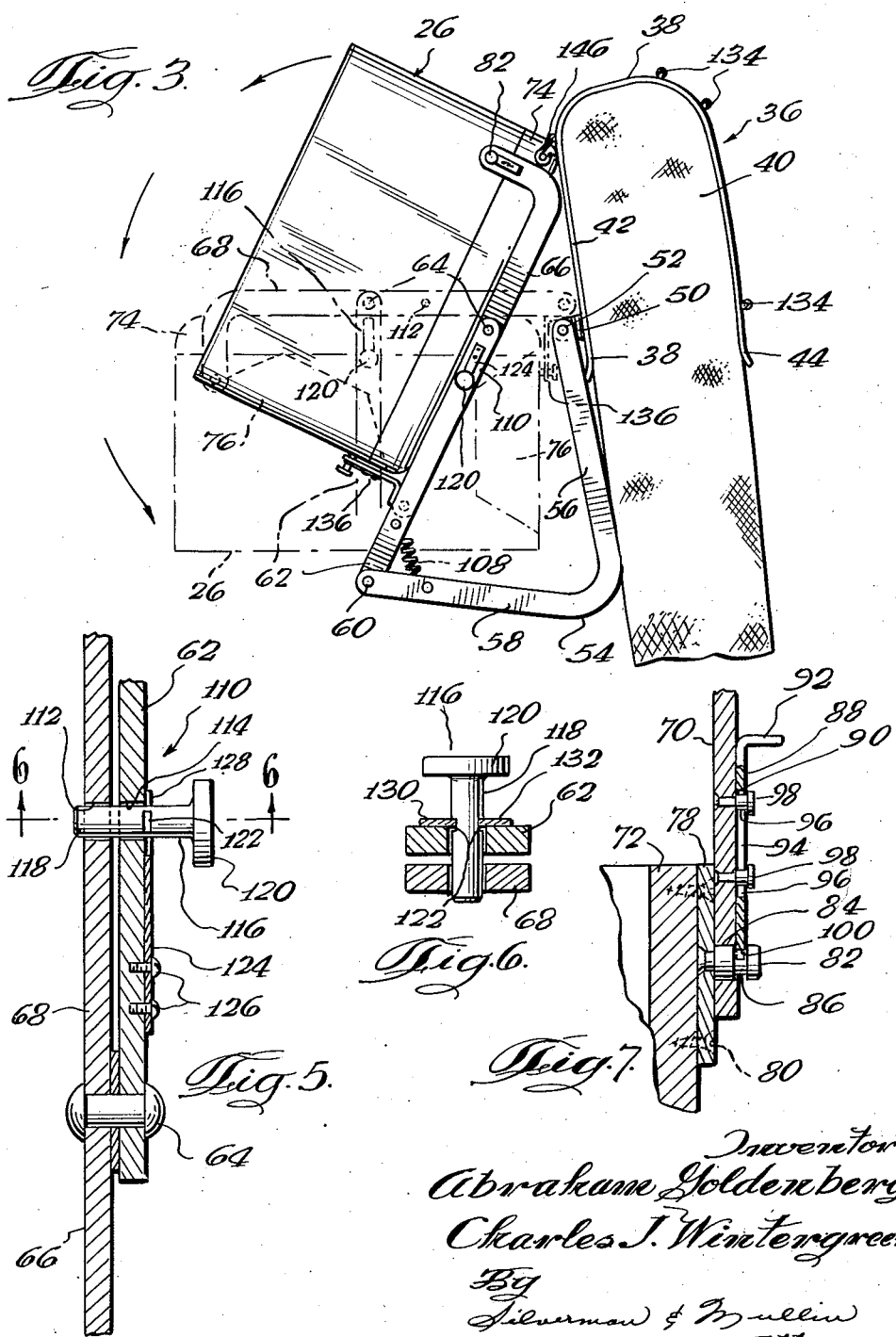

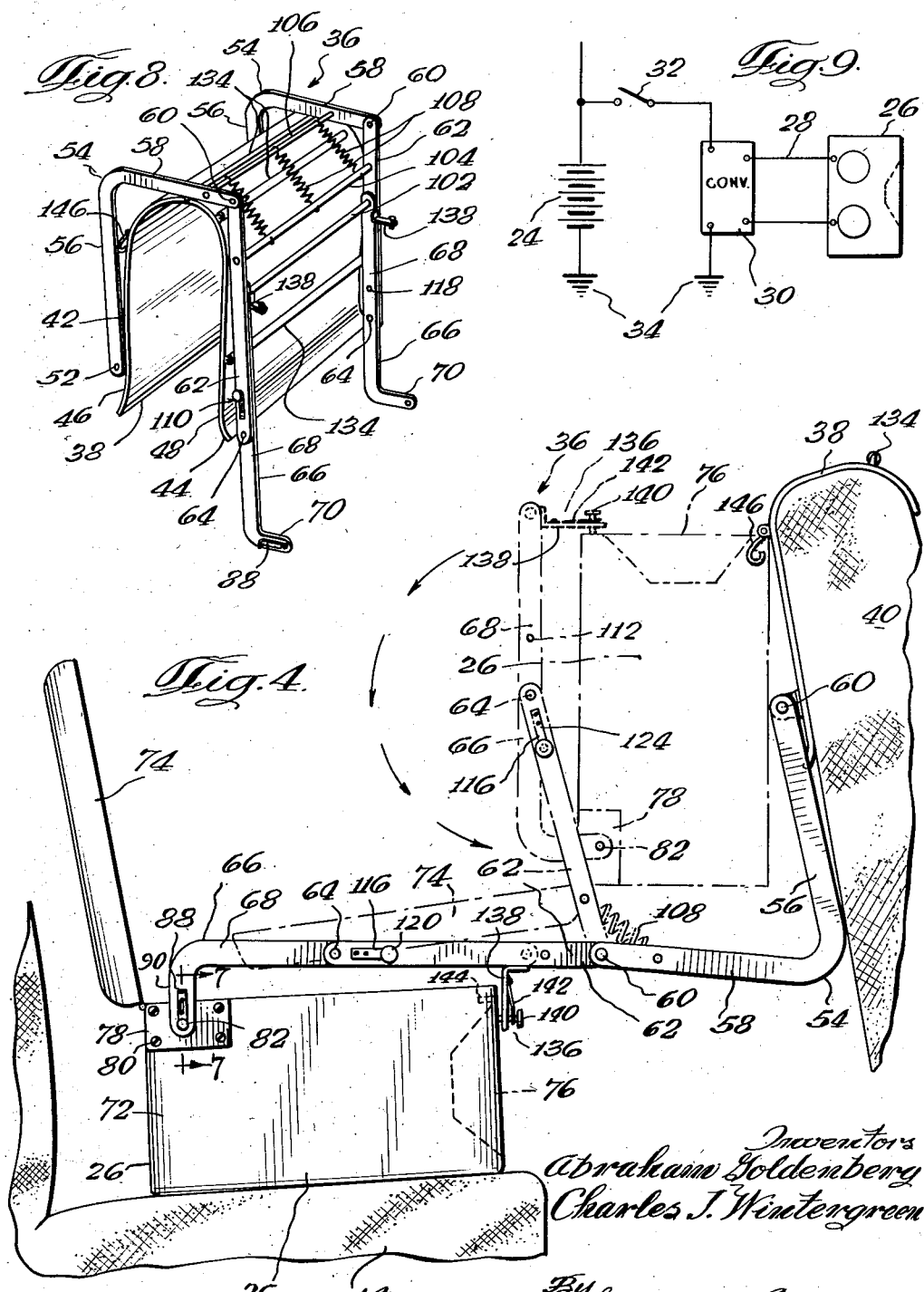

United States Patent Office 2,802,906
Patented Aug. 13, 1957

2,802,906
VEHICULAR ELECTROMAGNETIC SOUND RECORDING AND REPRODUCING SYSTEM

Abraham Goldenberg and Charles J. Wintergreen, Chicago, Ill.; said Wintergreen assignor to said Goldenberg Application August 14, 1953, Serial No. 374,350

9 Claims. (Cl. 179—100.2)

This invention relates to electromagnetic sound recording and reproducing devices and more particularly to a system and apparatus in which a portable magnetic recorder of the type adapted for use in connection with standard 110 volt alternating current house circuits may be utilized in an automotive vehicle and powered by the automobile electrical power source. The invention further relates to an apparatus for removably supporting the recorder or similar electrical device within the vehicle in a plurality of different positions so that the same may be utilized and manipulated by any of the occupants of the vehicle.

It is well known that electromagnetic sound recorders and reproducers are used for entertainment, education, business dictation, and sales promotion. It is also well known that automotive radio receivers are limited in scope in regard to the satisfaction of the entertainment preferences of individuals. Moreover, there are territorial limitations effecting the reception of the transmitted sound. In fact in certain sparsely populated areas, automobile radio receivers are often incapable of receiving even faintly the sound transmitted from distant radio transmitters.

It is therefore a primary object of this invention to afford an electromagnetic sound recording and reproducing system and apparatus which will overcome all of the objections set forth hereinabove.

Another object is to provide a magnetic sound recorder system in which a standard 110 volt alternating current device may be utilized in connection with the usual 6 volt direct current automobile electrical system.

A further object is to afford an apparatus for removably mounting a standard portable magnetic recording device conveniently within the cab of an automobile and with minimum interference to the seating capacity.

Still another object is to provide a mounting apparatus having means for changing the position of the recorder to suit the convenience of any of the occupants of the vehicle including the driver. An object relating thereto is to afford means within the mounting apparatus permitting the positioning of the recorder so that the same may be manipulated and operated either by the driver, the occupants of the front seat, or the occupants of the rear seat.

Still a further object is to provide a mounting apparatus for a portable magnetic recorder or similar device which may be removably mounted within the cab of an automobile without necessitating the use of any screws, bolts, clamps or similar mounting members. An object relating thereto is to so construct the mounting apparatus that it may be removed entirely from the automobile interior when desired and stored conveniently in the trunk of the automobile.

Yet another object of this invention is the provision of a removable electromagnetic sound recorder and reproducer which can be readily removed from the automobile for use elsewhere with an electrical current circuit of different type and voltage than that provided by the automobile.

Yet a further object of this invention is to afford a magnetic recorder in which the instrument may be positioned so that the loudspeaker affords maximum sound reproduction to the occupants of the automobile.

Another object is to provide a magnetic sound recording and reproducing system in which the instrument is mounted and arranged to minimize the danger of injury to the set which might result from the usual vibration and movement of the vehicle.

A further object is to afford a mounting means for a removable sound device by means of which the position of the device may be changed within the vehicle interior but insuring adequate clearance between the roof of the vehicle and the device.

And still another object is to provide a vehicular electromagnetic sound recording system and apparatus of simple, inexpensive construction, yet sturdy and most effective.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a side view of an automobile with portions of the body broken away to show the electromagnetic sound recording and reproducing system installed therein;

Fig. 2 is a side elevational view of the front seat of an automobile with the mounting apparatus installed thereon and showing in solid outline the instrument positioned on the front seat in operative position and in phantom outline two other successive positions of the instrument during the position-changing operation;

Fig. 3 is a side elevational view of a portion of the back of a front seat of an automobile showing in solid outline a third step in the position-changing operation and in phantom outline yet another position of the recorder prior to the positioning of the instrument in still another operational position;

Fig. 4 is a side elevational view of a portion of the back of an automobile front seat and a portion of the back seat showing in solid outline the position of the instrument in operational position in the back seat and showing in phantom outline another operational position of the instrument;

Fig. 5 is an enlarged fragmentary sectional view taken on the plane of line 5—5 in Fig. 2 of the drawings and illustrating a detail of construction of a portion of the mounting apparatus;

Fig. 6 is likewise an enlarged sectional view taken on the plane of line 6—6 in Fig. 5 of the drawings and viewed in the direction indicated;

Fig. 7 is a fragmentary sectional view taken on the plane of line 7—7 in Fig. 4 of the drawings and illustrating another detail of the construction of the apparatus;

Fig. 8 is a perspective view of the mounting apparatus portion of the invention; and Fig. 9 is a schematic wiring diagram of the electrical circuit system of this invention.

Referring now to Fig. 1 of the drawings, reference numeral 10 indicates generally an automotive vehicle having a trunk 12, a back seat 14 and a front seat 16

(indicated in dotted outline) and a dashboard or instrument panel 18. The vehicle 10, of course, has a body indicated generally by reference numeral 20 with a top 22. The vehicle is further provided with an electrical power source which may comprise a battery 24 shown only schematically in the wiring diagram of Fig. 9.

The magnetic recording system is shown mounted within the automobile in Fig. 1 of the drawings and comprises a portable recorder 26 illustrated in Fig. 1 as positioned on the front seat 16. The recorder is connected within an electrical circuit by means of suitable leads such as 28 and 29 first to a converter 30, then through a switch 32, which may be positioned on the instrument panel 18, to the battery 24 with suitable grounding of the battery and converter as illustrated at 34 in Fig. 9 of the drawings. The converter is illustrated as positioned in the trunk for convenience, since, when so situated, the seating capacity of the vehicle is not adversely affected. The function of the converter 30 is for the purpose of converting the 6 volt direct current of the automotive battery 24 to the 110 volt alternating current necessary for operation of the recorder 26.

As above described it will be readily apparent that we have provided a magnetic recorder system whereby a standard 110 volt alternating current portable electromagnetic recording and reproducing instrument or similar appliance may be effectively utilized in an automotive vehicle powered by the usual 6 volt direct current automotive electrical power source. However, it is readily apparent that the permanent positioning of the recorder 26 on the front seat 16 of the vehicle is impractical since it would interfere with the seating capacity of the vehicle and furthermore would leave the recorder unprotected against the vibration and other adverse conditions normally encountered in a mobile vehicle. For this reason, we have provided a novel and effective mounting apparatus indicated generally by reference numeral 36 in Figs. 2, 3, 4 and 8 of the drawings, which will now be described in detail.

Attention is directed particularly to Fig. 8 of the drawings in which it will be noted that the mounting apparatus 36 comprises a U-shaped clamping member 38 adapted to fit over the top of a back 40 of the front seat 16. This clamping member 38 may be formed of any suitable material such as sheet steel or aluminum. It may also be made of strip rather than sheet metal. The legs 42 and 44 of the U-shaped mounting member may be arcuately formed near the edges thereof, as at 46 and 48, so that when the member is mounted over the top of the seat back 40, it tends to clamp onto the seat back thereby retaining the mounting member thereon in firm, immovable relationship. However, this does not prevent the entire mounting apparatus 36 from being readily removed from the seat back 40 when and if desired.

Affixed to the clamping member 38 is a unique linkage by means of which the recorder 26 may be readily moved to any one of a number of positions within the cab of the vehicle 10. This linkage will now be described in some detail.

The back leg 42 of the clamping member 38 has formed at each side near the bottom thereof a boss or bracket such as 50 protruding outwardly at an angle of 90° to the plane of the clamping member 38. To each of these bosses 50 there is pivotally affixed as at 52, a boomerang shaped linkage strip 54, each comprising a pair of legs 56 and 58. The outer end of each of the legs 58 is pivotally connected by means of a pivot such as 60 to a straight linkage strip such as 62. The outer end of each of the latter mentioned linkage strips 62 is in turn pivotally connected by means of pivots such as 64 to L-shaped linkage members such as 66, each of which comprises a long straight leg 68 terminating in a short leg such as 70 disposed in a plane substantially 90° to that of the long leg 68.

The short legs 70 are provided with novel means for pivotally and removably mounting the recording instrument 26 therebetween. This mounting means comprises a pair of cooperating members which will subsequently be described in greater detail.

As will be noted from the drawings, the recording device 26 comprises a case 72, having a hinged top cover 74 with a loud speaker 76 positioned at the front of the case 72. The recording tape spools and controlling knobs and buttons (not shown in the drawings) may be positioned within the case 72 near the top front thereof.

At each side of the case 72 as at the upper corner farthest removed from the speaker 76, may be affixed a mounting plate 78 by any suitable means such as wood screws 80. Affixed to this mounting plate 78 may be a novel headed pivot member 82. This pivot member 82 is adapted to protrude through an annular opening 84 formed in the linkage leg 70. It will be noted that the pivot 82 is formed with an annular undercut groove 86 which is adapted to cooperate with a locking member 88 affixed to the linkage leg 70. This locking member 88 is so constructed that when it is in operational position, the linkage is locked to the recorder 26 but in such a way that the recorder may be pivotally moved about the axis of the pivot 82.

Specifically, the locking member 88 may comprise a sliding strip 90 having a protruding finger engaging knob 92 formed at the upper end thereof. The locking member is provided with a central elongate slot 94 formed with a pair of annular key-ways such as 96 each adapted to loosely accommodate therein a headed pin 98. By means of this structure the locking member 88 is affixed in sliding relationship to the linkage leg 70. A semicircular cutout 100, open to the bottom edge of the strip 90, is formed in said sliding strip. The cutout portion 100 of the strip 90 may be moved to abut the portion of the pin 82 within the groove 86. Thus, it will be readily perceived that when the locking member 88 is lowered so that the cutout 100 is positioned within the groove 86, the headed pivot pin 82 is retained therein by the shoulders of the groove but without interfering with the pivotal movements of the recorder 26 with respect to the linkage member 66.

When it is desired to remove the recorder 26 from the linkage member, the locking member 88 is moved by means of the finger engaging knob 82 upwardly so that the same is disengaged from the groove 86 of the pivot member 82. This permits the linkage member 66 to be flexed outwardly a distance sufficient to clear the head of the pivot member 82, thereby permitting the removal of the recorder 26 from the mounting apparatus 36.

As was mentioned hereinabove, the mounting apparatus 36 is provided with pivoted linkage strips at each side of the clamping member 38. These linkage strips may be connected and braced by means of a plurality of cross bars such as 102, 104 and 106. It will be noted that each cross bar is positioned one between the parallel members of each of the three linkage strips, namely 54, 62 and 66. The cross bar 106 connecting the boomerang shaped linkage strips 54 and the cross bar 104 connecting the straight linkage strips 62, may have stretched therebetween a plurality of coiled springs such as 108, the purpose of which will be revealed as the description proceeds.

It will further be noted that the pivots 64 of the L-shaped linkage strips 66 are positioned medially of the straight legs 68 so that a portion of the straight legs 68 is positioned adjacent the straight linkage strips 62. A novel locking device is provided for locking these two linkage members 62 and 66 together so that the linkage strip 66 may be prevented from pivoting about its pivots 62. When so locked the L-shaped linkage strips serve as extensions of the straight linkage strips 62. This locking device 110 will now be described in detail.

The linkage leg 68 of linkage member 66 and the linkage member 62 may be formed with a pair of aligned passages 112 and 114 formed therethrough. Within these aligned passages may be positioned a latching member 116 comprising a pin 118 with a head 120 and a pair of straight grooves such as 122 formed in diametrically opposed positions on the sides of the pin 118. A leaf spring 124 may be affixed to the linkage strip 62 by means of a pair of screws 126 positioned at the lower end of the leaf spring 124. The spring 124 is bifurcated as at 128 so that the legs 130 and 132 of the bifurcation are adapted to fit within the grooves 122 thereby holding the latch 116 in operational position. When it is desired to "break" the linkage strips 66 and 62 so that the same may be rotated about the pivot 64, the latching member 116 is grasped at the head 120 and the pin 118 is pulled out against the work of the spring 124 until the end of the pin 118 clears the linkage leg 68. As soon as this is done the linkages are free to rotate about their pivot 64. The function of this novel linkage assembly will be disclosed as the description proceeds.

It will be noted from the examination of Figs. 2 and 4 of the drawings that the recorder 26 may be shifted from one position to the other by means of the linkage members described hereinabove. To facilitate this movement of the recorder 26, a plurality of rollers such as 134 may be rotatably mounted on the outer surface of the clamping member 38, as shown in Figs. 2, 3 and 8 of the drawings, in planes parallel to the cross members 102, 104 and 106.

Turnnig now to a more detailed description of the manner in which the mounting apparatus may be utilized for moving the recorder 26 to the various positions within the vehicle 10, attention is directed first to Fig. 2 of the drawings. In this figure it will be noted that the recorder 26 is positioned with the speaker 76 facing forwardly and the cover 74 opening from the front end of the instrument. In this position the linkage members 62 and 66 are locked by means of the latching device 116 so that they cooperate in effect as a straight linkage strip. Also in this position the instrument is readily accessible for operation by the driver, and the speaker is positioned for the best possible sound reproduction to the occupants of the front seat. Moreover, the controls are readily accessible to the passenger occupant of the front seat.

When it is desired to shift the recorder from the front seat, the instrument is rotated about its pivot 82 to the position indicated in phantom outline in Fig. 2 of the drawings. A second latching member 136 may be provided for retaining the recorder 26 in the above-mentioned pivoted position. This second latching member may comprise a pair of brackets such as 138 affixed near the upper end of the linkage leg 68 as shown in Figs. 2, 4 and 8 of the drawings. At the outer end of the bracket 138 a pin 140 may be positioned with a leaf spring 142 urging the pin downwardly. The pin 140 is adapted to fit within a complementary opening such as 144 in the recorder 26 and thereby secure the recorder in the upturned pivoted position.

Returning now to further consideration of the movement of the recorder 26, after the instrument has been pivoted to the position shown in Fig. 2 of the drawings, it is pushed or lifted upwardly until it assumes the second position shown in phantom outline at the top of the seat back 40 in Fig. 2 of the drawings. In this position it will be noted that the linkage members 54 have been pivoted about the pivots 52 so that the legs 56 approach a horizontal position and the legs 58 have been moved from an approximate horizontal position to a more vertical position. Likewise the linkage members 62 and 66 have been moved from a substantially vertical position to an approximate horizontal position. During this phase of the movement, the rollers 134 facilitate the movement of the recorder 26 since the recorder bears against the rollers and is moved as the rollers rotate. The springs 108 tend to prevent the various linkage members from vibrating or inopportunely pivoting, thereby insuring against damage to the instrument 26.

When the instrument 26 has reached the third position shown in phantom outline in Fig. 2 of the drawings, it may then be moved further to the storage position shown in solid outline in Fig. 3. In this position the instrument is inclined with the back of the cover 74 abutting the back 40 of the front seat where it may be retained by means of a hook device such as 146. In this position it will be noted that the speaker 76 faces obliquely downwardly and the cover 74 is positioned facing the back 40 of the front seat. It should further be noted that in this position the boomerang shaped linkage member 54 has been pivoted through an angle of substantially 180° so that the leg 56 now depends from the mounting boss 50 and the various other linkage members are positioned as shown in Fig. 3 of the drawings.

As was above stated the position of the instrument as shown in solid outline in Fig. 3 of the drawings is primarily a storage position. When it is desired to move the instrument to a position where it may be used by the occupants of the back seat 14, the linkage member 62 is merely rotated further about its pivot 60 until the linkage strip is approximately aligned with the leg 58. In this position the recorder 26 now rests on the back seat 14 with the speaker 76 facing forwardly and the cover 74 opening from the front of the instrument. Obviously, the instrument is now accessible to the occupants of the back seat with the speaker located in the most favorable sound-transmitting position.

Up to this point we have described only the operational positions of the recorder with the instrument resting on either the front seat or the back seat. Obviously, either of these positions reduce the seating capacity of one or the other vehicle seats. For this season the mounting apparatus has been so constructed that the instrument may be moved to an operating position which does not displace any of the seating area of the vehicle. Such a position is illustrated in phantom outline in Fig. 4 of the drawings wherein it is evident that the instrument 26 is positioned with the speaker 76 facing upwardly and the cover 74 facing towards the back of the vehicle.

To achieve the above-described position, the latching member 116 is utilized. Accordingly, the linkage members 66 and 62 are "broken" so that they are free to pivot about their axes 64. Thus, as shown in Fig. 3 of the drawings, the recorder 26 is moved from the position shown in solid outline to the position shown in phantom outline with the linkage member 62 positioned vertically and the leg 68 of the linkage member 66 positioned horizontally. The linkage member 66 is then further pivoted about the pivot axis 64 until the recorder 26 assumes the position shown in phantom outline in Fig. 4 of the drawings. The direction of movement of the instrument is shown by the arrows in Figs. 3 and 4 of the drawings and it should further be noted that the movement is accomplished within a relatively small space below the top 22 of the vehicle.

When the instrument has assumed the position shown in phantom outline in Fig. 4 of the drawings, it will be noted that the linkage leg 68 is now positioned in a vertical plane and the linkage member 62 is positioned in an oblique plane parallel to the inclined position of the linkage leg 56. In the latter mentioned position the loudspeaker faces upwardly and the cover faces towards the rear of the vehicle so that the same may be manipulated by the occupants of the rear seat and likewise be manipulated by at least the passenger occupants of the front seat. Moreover, the speaker 76 is located in a position favorable for sound reproduction to both the occupants of the front seat as well as those of the rear seat.

As was previously mentioned, the recorder 26 may be removed from the mounting apparatus 36, disconnected from the recorder system and removed entirely from the vehicle for use, if desired, in a home or office location. If further desired, the mounting apparatus 36 may be removed from the seat back 40 thereby restoring the automotive vehicle to its natural condition.

From the foregoing description it should be apparent that we have provided a simple, yet effective, electromagnetic recording system for automotive vehicles permitting the use of a standard portable 110 volt magnetic sound recording and reproducing instrument. We have further provided a mounting device by means of which a recorder or other appliance may be positioned in any convenient location within the vehicle thereby making the instrument accessible to any and all of the occupants of the vehicle. We have further provided means by which the recorder is mounted within the vehicle in such a manner that it is not readily affected by the vibrations accompanying the movement of the vehicle, and finally the apparatus permits operational positioning of the recorder without interfering with the seating capacity of the vehicle itself.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. In a vehicular electromagnetic sound recording and reproducing system for use in an automobile having a trunk, and an instrument panel and a plurality of seats, a portable 110 volt alternating current electromagnetic sound recorder and reproducer, an automobile battery power source capable of delivering direct current at approximately 6 to 12 volts, a converter capable of converting said battery power to 110 volt alternating current, a plurality of leads connecting together said recorder, converter and battery in a suitable electrical circuit, a switch mounted on the instrument panel of the automobile and controlling the delivery of electrical power to said recorder, and a mounting apparatus adapted to secure said recorder within the automobile, said mounting apparatus having means for moving said recorder to a plurality of positions for ready access by any of the occupants of the automobile.

2. The electromagnetic sound recording and reproducing system of claim 1 in which said converter is positioned in the trunk of the automobile and said recorder is removably connected in said circuit so that the same may be removed from the circuit for use with a standard 110 volt alternating current source.

3. The recorder of claim 1 in which said mounting apparatus comprises a removable clamping member mountable over the back of one of the automobile seats and a plurality of linkage arms pivotally connected one to the other, one pair of ends of said linkage arms pivotally mounted on said clamping member and the other pair of ends pivotally and removably mounting said recorder.

4. In an automobile sound recording and reproducing system including a portable recorder; a mounting apparatus comprising a clamping member adapted to be removably mounted over the back of an automobile seat and a pair of articulated arms, one pair of ends of said arms pivotally affixed to said clamping member and the other pair of ends of said arms pivotally affixed to said recorder, said articulated arms comprising a plurality of linkage arms pivotally connected one to the other and movable to position said recorder in a plurality of operative and storage positions convenient to the automobile occupants, said linkage arms comprising a pair of boomerang-shaped arms, a pair of straight arms and a pair of L-shaped arms, said arms pivotally connected one to the other, latching devices joining together said straight linkage arms and said L-shaped linkage arms in immovable relationship and a locking device locking the outer end of one leg of said L-shaped linkage arms to said recorder in pivoting relationship.

5. The recording and reproducing system of claim 4 in which said straight linkage arms and said L-shaped linkage arms are connected by means of pivots, said pivots positioned medially of the longer leg of said L-shaped linkage arms, both pairs of said linkage arms formed with aligned passages therethrough, a headed pin loosely positioned in said passageways and a leaf-spring movably mounting said pin in said passageways.

6. The recording and reproducing system of claim 4 in which a pair of mounting plates are affixed one to each of two opposite corners of said recorder, a headed pin having an annular groove protruding from each of said mounting plates, the adjacent shorter leg of each of said L-shaped linkage arms formed with annular openings near the ends thereof, said headed pins adapted to protrude through said annular openings and a locking member slidably mounted on each of said L-shaped linkage arms and adapted to cooperate with said annular grooved portions of the pins to lock the linkage arms to the recorder.

7. In combination with an automobile front seat, an instrument mounting device comprising, an inverted U-shaped clamping member adapted to fit over the back of said front seat, a plurality of rollers rotatably mounted laterally above the surface of said clamping member, a pair of mounting brackets positioned in aligned lateral relationship one on each side of said clamping member, a pair of boomerang-shaped linkage arms pivotally connected at one end one to each of said brackets, a pair of straight linkage arms pivotally connected at one end thereof one to each of the free ends of said boomerang-shaped linkage arms, a pair of L-shaped linkage arms pivotally connected one to each of the free ends of said straight arms at points intermediate of the length of the long legs of said L-shaped linkage arms, means for pivotally and removably affixing the free ends of the shorter legs of said L-shaped linkage arms to an instrument, a plurality of cross-arms connecting said linkage arms and coiled springs stretched between two of said adjacent cross-arms.

8. In a mounting apparatus of the character described; a clamping member adapted to be removably mounted on a supporting member, a pair of articulated arms affixed to said clamping member, the free ends of said arms capable of being pivotally affixed to an object, said articulated arms comprising a plurality of linkage arms pivotally connected one to the other and movable to position said object in a plurality of convenient operative and storage positions, said linkage arms comprising a pair of boomerang-shaped arms, a pair of straight arms and a pair of L-shaped arms, said arms pivotally connected one to the other latching devices joining together said straight linkage arms and said L-shaped linkage arms in immovable relationship and a locking device locking the outer end of one leg of said L-shaped linkage arms to said object in pivoting relationship.

9. The mounting apparatus of claim 8 in which said straight linkage arms and said L-shaped linkage arms are connected by means of pivots, said pivots positioned medially of the longer leg of said L-shaped linkage arms, both pairs of said linkage arms formed with aligned passages therethrough, a headed pin loosely positioned in said passageways and a leaf-spring movably mounting said pin in said passageways.

References Cited in the file of this patent

UNITED STATES PATENTS

| | | |
|---|---|---|
| 1,326,650 | Doerr | Dec. 30, 1919 |
| 2,655,563 | Connel | Oct. 13, 1953 |
| 2,672,503 | Halden | Mar. 16, 1954 |